Nov. 29, 1966 R. E. PRESCOTT ET AL 3,289,005

ADJUSTABLE MOUNTING MEANS FOR PHOTOCELLS
LOCATED IN OUTDOOR STRUCTURES
Filed Feb. 25, 1964

INVENTORS R. E. PRESCOTT
W. E. WHIDDEN
BY [signature]
ATTORNEY

United States Patent Office 3,289,005

Patented Nov. 29, 1966

3,289,005

ADJUSTABLE MOUNTING MEANS FOR PHOTOCELLS LOCATED IN OUTDOOR STRUCTURES

Robert E. Prescott, Rumson, and William E. Whidden, Middletown, N.J., assignors to Bell Telephone Laboratories, Incorporated, New York, N.Y., a corporation of New York Filed Feb. 25, 1964, Ser. No. 347,168

5 Claims. (Cl. 250—239)

This invention relates to outdoor telephone installations and more particularly to apparatus for controlling electrical devices in outdoor telephone booths. The general object of the invention is to enhance the reliability, security and operating characteristics of such control apparatus.

Outdoor telephone installations are now widely employed in both rural and urban areas. The demand for this service has increased substantially in recent years. There has been a corresponding need for improving the comfort and safety features of these installations. Outdoor telephone booths are often installed in remote locations, are usually subject to extremes of weather conditions and invariably must accommodate a large amount of human traffic. These considerations dictate a requirement for reliable artificial illumination during periods of darkness. Since the need for artificial illumination is intermittent, it is necessary for economic reasons to provide an automatic control for turning the illumination on and off at appropriate times. It is preferable for the control to be responsive automatically to a predetermined natural light level at the booth site.

For years a variety of automatic electrical device control means, including many using light-sensitive cells, have been employed in telephone booths as well as in other outdoor structures. Certain persistent problems, however, have not been overcome by any known prior art. For example, it has been usual to mount the light-sensitive element on the outside of the booth, shielded from the elements only by superficial means such as a roof overhang. In this environment, however, the cell has been subject to deterioration from moisture with a resultant shortened life. Unprotected exposure of the light-sensitive element has invited unauthorized tampering and has subjected the cell to occasional damage through inadvertence on the part of telephone users. Furthermore, when so mounted, the light cell frequently has had an undesired sensitivity to transient light conditions such as flashing advertising signs, automobile headlights, and so forth. Means for protecting a light-sensitive cell from atmospheric conditions and transient light are, of course, well known, as, for example, the means suggested by Keeran in Patent 3,085,179, issued April 9, 1963. Such means, however, necessarily leave the apparatus, including the shading feature, exposed to the dangers of vandalism and unintended damage. Additionally, maintenance problems have occurred in prior art arrangements in that the light-sensitive element is not readily removable from the structure on which it is mounted.

Accordingly, a specific object of the invention is to increase the comfort and safety of outdoor telephone booths.

Another object of the invention is to protect in an inexpensive and simple fashion a telephone booth electrical device control from adverse weather conditions, from inadvertent damage and from vandalism.

An additional object of the invention is to simplify the control of transient light influences upon a light-sensitive element.

Still another object of the invention is to simplify the mounting of a light-sensitive cell in a telephone booth.

These and other objects are achieved in accordance with the principles of the invention by a two-element light-sensitive cell assembly in which the outer element is mounted through a perforation in the telephone booth and the inner element containing the light-sensitive cell is adjustably mounted within the outer element for selective positioning of the light cell within the outer element. The latter includes a window portion which protrudes slightly beyond the booth for direct exposure to the prevailing light conditions. This window is sealed to protect the assembly from dust, moisture and other deleterious matter. The inner member is held in any given adjustment with respect to the window by the frictional gripping action of the outer member upon its surface. The inner member readily may be withdrawn entirely for maintenance or replacement, or to expedite assembling or dismantling of the booth structure. The switching apparatus associated with the light-sensitive cell is located remotely within the telephone booth in a safe, concealed position. No part of the cell assembly is exposed to the elements or to unauthorized tampering except for the very inconspicuous and relatively impenetrable window portion of the outer tube.

In one illustrative embodiment of the invention the outer member is a tube having at one end thereof a flanged portion in which a translucent material is sealed. The inside portion of the flange seats snugly against the outer surface of the booth. Compliant cantilever type friction grips adjacent the flanged end serve to snap-mount the outer tube within a perforation in the booth. Although the outer element may be located in any advantageous section of the telephone booth, it is preferable to locate it in the roof for optimum exposure to the ambient light and also to make it relatively inaccessible to damage. The inner element is also tubular and contains the light-sensitive cell at one end. The inner tube is slidably mounted within the outer tube with the cell end facing the window.

Accordingly, one feature of the invention is a two-element photoconductive cell assembly in which the outer element protects the cell-containing inner element from harmful and corroding substances.

Another feature of the invention resides in means for simplifying the installation and maintenance of a photoconductive light cell assembly in an outdoor structure.

Still another feature of the invention resides in means integral with mounting means for withdrawing a light-sensitive cell from a source of ambient light to lessen the influence on the cell of transient light.

These and other objects and features of the invention will be fully comprehended by reference to the following detailed description of an illustrative embodiment and to the appended drawing, in which.

Figure 1:
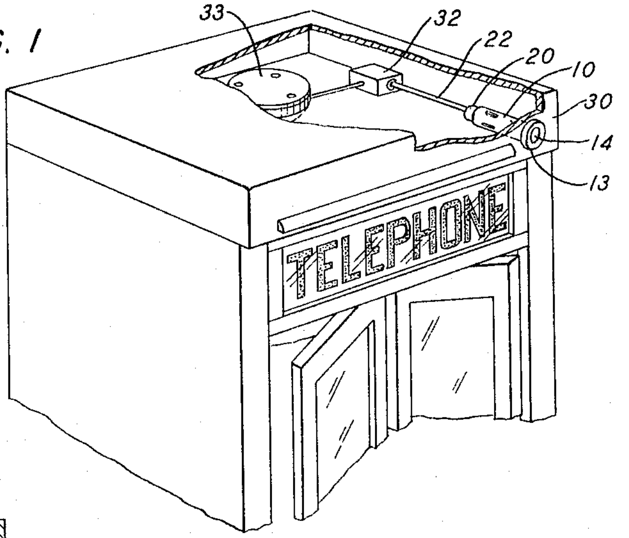
FIG. 1 is a perspective view of a typical telephone both including a roof, structural members and a door, and showing a light control assembly in accordance with the invention mounted in the roof.

The telephone booth shown in FIG. 1 is currently widely used and includes a readily removable roof. The inner tube 20 is shown positioned within snap-mounted outer tube 10, and connected by conductor 22 to switching means 32. Electrical device 33, which at least includes illuminating means, is shown connected to switch 32.

Figure 2:
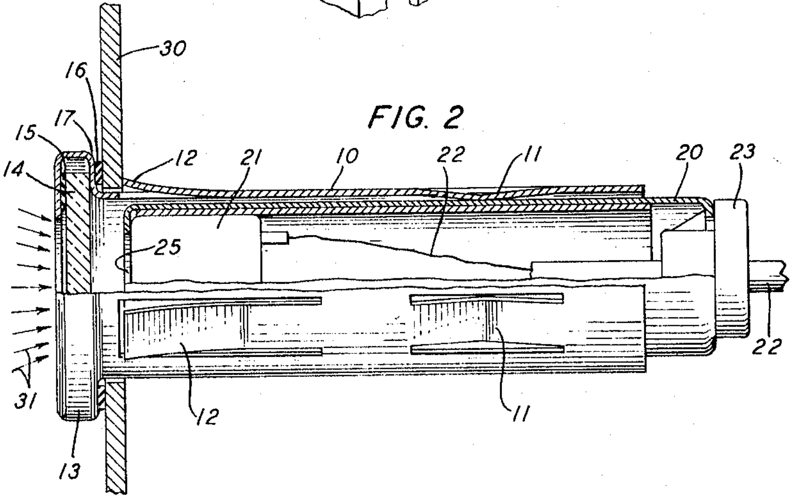
FIG. 2 is an assembly of the outer tube mounted in the booth and with the inner tube slide-mounted in the outer tube, and showing the translucent window, the light cell and the snap-mounting feature.

Referring to FIG. 2, in accordance with the invention, outer tube 10 is shown mounted in a perforation in telephone booth structure 30 by the gripping action of compliant cantilever snap grips 12 on the inner surface of booth 30. A weather gasket 16 seats between the outer surface of booth 30 and the flanged surface 17 of end portion 13. The end portion 13 contains a weatherproof translucent piece 14 which is exposed to the ambient light condition 31. A gasket 15 seals out the moisture, dust and other undesirable matter. An inner tube 20 containing at one end thereof a light-sensitive hermetically sealed cell 21 is mounted within outer tube 10 and held by the gripping action of the friction grips 11 of outer tube 10. Inner tube 20 has an opening 25 at the end where cell 21 is mounted, allowing ambient light 31 which has traveled through window 14 to impinge upon the cell 21. A conductor 22 leads from cell 21 to the switching means 32 shown in FIG. 1. A strain-relieving bushing 23 is included.

During the daylight hours, when the ambient-light intensity is above a prescribed value, the control current regulated by light cell 21 energizes switch 32. The load contacts (not shown) are held open, and the booth lamps 33 are not lighted. With decreasing light intensity the control current falls, gradually de-energizing the switch 32 until the prescribed ambient-light intensity is reached. At this point, the load contacts are closed and the booth lamps 33 are lighted. The load contacts of switch 32 are designed to be normally closed to ensure lighting of the lamps in the event of a malfunctioning light control.

Figure 3:
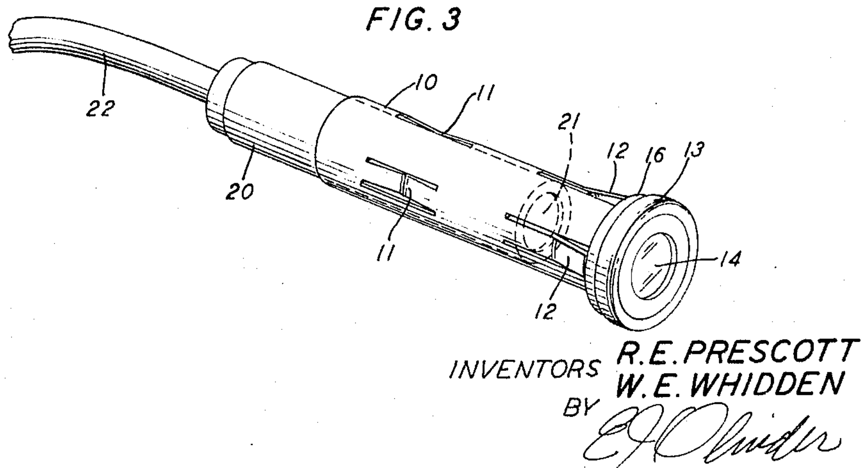
FIG. 3 is an assembly of the outer tube and the inner tube showing the inner tube withdrawn from the window portion of the outer tube to adjust the intensity of light impinging on the cell.

Transient light conditions at the telephone booth site, such as flashing signs or auto headlights, may activate cell 21 at unwanted times during the darkness period. In such case, in accordance with the invention, the inner tube 20 and its cell 21 may be slidably adjusted away from window 14 to conceal the cell from these transitory effects, as shown in FIG. 3. The inner tube 20 is held in adjustment within outer tube 10 by the action of friction grips 11. When daylight approaches, the light intensity impinging on the cell 21 will eventually cause sufficient current to flow to energize switch 32 and turn off the illumination.

It is understood that the embodiment described is merely illustrative of the inventive concept disclosed and herein claimed. Many variations may be practiced by persons skilled in the art without departing from the spirit and the scope of the invention.

What is claimed is:

1. A photosensitive element mounting for outdoor structures, comprising in combination: an outer tube; a flange at one end of said tube; a translucent window sealably mounted outwardly of said flange; means for mounting said outer tube through a similarly-shaped passage between an outer wall exposed to ambient light and an inner wall of said structure; means for locking said flange against said outer wall; an inner tube having a light-sensitive cell at one end thereof; and means for frictionally engaging said inner tube within said outer tube and for adjustably positioning said cell from a point adjacent said window to a point remote therefrom.

2. A mounting in accordance with claim 1, wherein said locking means comprises a plurality of raised cantilevered arms formed by cut-out wall portions of said outer tube, insertion of said outer tube through said passage compressing the arms, and the end of each said arm clearing said passage and springing up in contact with said inner wall in response to abutting of said flange and said outer wall.

3. A mounting in accordance with claim 2, wherein said frictional engaging means comprises a plurality of inwardly-protruding longitudinal cut-outs of said outer tube wall, said cut-outs resiliently gripping said inner tube on insertion thereof.

4. Lighting control apparatus for outdoor telephone booths, comprising in combination: an outer hollow member having an outwardly-extending end flange; a translucent window sealed within said flange; means including a plurality of raised surface portions of said outer member for locking same within a passage through a wall of said booth, said flange abutting the exterior of said booth wall with said window exposed to ambient light; an inner member insertable into said outer member and including a photocell at one end; means including a plurality of depressed surface portions of said outer member for frictionally retaining said inner member at various points of adjustment between said window and photocell; lighting means including a switch; and means connecting said photocell to said switch; whereby control of the lighting means is governed by the distance between said cell and window selected with regard to ambient-light conditions.

5. Apparatus in accordance with claim 4, wherein said outer and inner members comprise coaxial tubes and wherein said raised surface portions comprise a plurality of resilient cantilever arms, the ends of said arms spreading into contact with said booth inner wall in response to contact of said flange with said outer wall during insertion.

References Cited by the Examiner

UNITED STATES PATENTS

| | | | |
|---|---|---|---|
| 2,812,915 | 11/1957 | Davies et al. | 250—239 X |
| 2,933,612 | 4/1960 | Cheverton et al. | 250—239 |
| 3,040,180 | 6/1962 | Healy | 250—211 X |
| 3,059,102 | 10/1962 | Sherron | 240—2 |

References Cited by the Applicant

UNITED STATES PATENTS

| | | |
|---|---|---|
| 3,085,179 | 4/1963 | Keeran. |

RALPH G. NILSON, *Primary Examiner.*

WALTER STOLWEIN, *Examiner.*